(12) United States Patent
Ando

(10) Patent No.: US 9,383,884 B2
(45) Date of Patent: *Jul. 5, 2016

(54) TOUCH PANEL AND TOUCH TYPE INPUT DEVICE

(71) Applicant: MURATA MANUFACTURING CO., LTD., Nagaokakyo-shi, Kyoto-Fu (JP)

(72) Inventor: Masamichi Ando, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/612,428

(22) Filed: Feb. 3, 2015

(65) Prior Publication Data

US 2015/0153880 A1 Jun. 4, 2015

Related U.S. Application Data

(63) Continuation of application No. 13/968,493, filed on Aug. 16, 2013, now Pat. No. 9,128,553, which is a continuation of application No. 13/312,098, filed on Dec. 6, 2011, now Pat. No. 9,134,826, which is a continuation of application No. PCT/JP2010/058776, filed on May 25, 2010.

(30) Foreign Application Priority Data

Jun. 11, 2009 (JP) .................................. 2009-140287

(51) Int. Cl.
*G06F 3/041* (2006.01)
*G06F 3/046* (2006.01)
*G01L 5/16* (2006.01)

(52) U.S. Cl.
CPC . *G06F 3/046* (2013.01); *G01L 5/16* (2013.01); *G06F 3/041* (2013.01); *G06F 3/0414* (2013.01); *G06F 3/0416* (2013.01)

(58) Field of Classification Search
None
See application file for complete search history.

(56) References Cited

U.S. PATENT DOCUMENTS

| 5,298,602 A | 3/1994 | Shikinami et al. |
| 8,298,242 B2 | 10/2012 | Justis et al. |
| 2003/0067449 A1* | 4/2003 | Yoshikawa ............... G06F 3/016 345/173 |

(Continued)

FOREIGN PATENT DOCUMENTS

| EP | 1947551 A | 7/2008 |
| GB | 2451267 A | 1/2009 |

(Continued)

OTHER PUBLICATIONS

Japanese Office Action issued for corresponding application No. JP 2011-518402, dated May 29, 2013 (with English translation).

(Continued)

*Primary Examiner* — Srilakshmi K Kumar
*Assistant Examiner* — Parul Gupta
(74) *Attorney, Agent, or Firm* — Arent Fox LLP

(57) ABSTRACT

A touch panel that includes a molecule oriented polylactic acid film having a first principal plane and a second principal plane. The polylactic acid film is constructed to generate a voltage when the polylactic acid film is deformed to have a concave shape on the first principal plane and a convex shape on the second principal plane. An electrode is arranged adjacent at least one of the first principal plane and the second principal plane of the polylactic acid film so as to detect the voltage.

17 Claims, 13 Drawing Sheets

(56) References Cited

U.S. PATENT DOCUMENTS

| | | | |
|---|---|---|---|
| 2004/0104827 A1* | 6/2004 | Katsuki | G06F 3/0436 341/34 |
| 2008/0018201 A1* | 1/2008 | Matsumoto | G06F 3/041 310/319 |
| 2008/0176042 A1 | 7/2008 | Nashiki et al. | |
| 2010/0182124 A1 | 7/2010 | Chou | |
| 2010/0200309 A1 | 8/2010 | Yilmaz et al. | |
| 2011/0241021 A1 | 10/2011 | Oder | |
| 2012/0242592 A1 | 9/2012 | Rothkopf et al. | |

FOREIGN PATENT DOCUMENTS

| | | |
|---|---|---|
| JP | 56-040399 A | 4/1981 |
| JP | 62-135460 U | 8/1987 |
| JP | 04-015813 A | 1/1992 |
| JP | 5-061592 A | 3/1993 |
| JP | 05-152638 A | 6/1993 |
| JP | H06-142184 A | 5/1994 |
| JP | H029-237152 A | 9/1997 |
| JP | 2004-125571 A | 4/2004 |
| JP | 2005-213376 A | 8/2005 |
| JP | 2006-039667 A | 2/2006 |
| JP | 2006-163618 A | 6/2006 |
| JP | 2006-278034 A | 10/2006 |
| JP | 2009-076432 A | 4/2009 |
| WO | WO-2009-041170 A1 | 4/2009 |

OTHER PUBLICATIONS

Japanese Office Action issued for corresponding application No. JP 2013-151094, dispatch date Mar. 11, 2014 (with English translation).

* cited by examiner

TOUCH PANEL AND TOUCH TYPE INPUT DEVICE

CROSS REFERENCE TO RELATED APPLICATIONS

The present application is a continuation of application Ser. No. 13/968,493, filed Aug. 16, 2013, which is a continuation of application Ser. No. 13/312,098, filed Dec. 6, 2011, which is a continuation of International application No. PCT/JP2010/058776, filed May 25, 2010, which claims priority to Japanese Patent Application No. 2009-140287, filed Jun. 11, 2009, the entire contents of each of which are incorporated herein by reference.

FIELD OF THE INVENTION

The present invention relates to a touch panel and a touch type input device, which are provided on e.g., a display surface and are directly touched with a finger or are touched using an exclusive instrument by the user to enable position information and pressed information on a plane to be inputted at the same time.

BACKGROUND OF THE INVENTION

In recent years, the number of touch type input devices, that is, devices adopting a touch panel type has been increased significantly. The number of devices which adopt the touch panel type as an input interface has been increased significantly together with the development of the thinned display technique, such as portable phones, portable game machines, and portable music players as well as bank ATMs and ticket vending machines in stations.

Currently used touch panels are mainly of a resistance film type and an electrostatic capacity type, and in addition to these, there are touch panels using an optical type, an electromagnetic induction type, and elastic surface waves with piezoelectric. Typically, these types are used to detect position information. That is, coordinate information showing in what position on a touch panel the user touches is obtained to execute a designated process based on this information. As typified by bank ATMs, the user touches a button portion displayed on the screen to be able to operate the device as if the user pressed an actual button for operation. With the recent development of the graphic user interface (GUI) process technique, there are also devices in which the user can touch the screen to scroll displayed images or can directly control a graphically displayed slide switch with a finger.

The touch panels have been required to be further varied, so that the request to obtain pressed information together with position information at the same time has been increased recently. That is, if binary information showing in what position on the screen the user touches and how strong the user touches the position is detected, the operability can be further improved.

As a technique in connection with this, Patent Document 1 discloses a technique in which a position detecting device is overlapped with a pressure sensitive sensor to detect position information and pressed information at the same time.

Also, Patent Document 2 discloses a method which uses a piezoelectric film to obtain pressed information and detects in what portion of a plurality of electrode lines formed in a lattice shape on the piezoelectric film a detected voltage appears to obtain position information.

Patent Document 1: Japanese Patent Application Laid-Open (JP-A) No. 5-61592

Patent Document 2: Japanese Patent Application Laid-Open (JP-A) No. 2006-163618

SUMMARY OF THE INVENTION

In the touch panel described in Patent Document 1, the pressure sensitive sensor formed of a piezoelectric film or a pressure sensitive resistor sheet is overlapped onto a typical touch panel performing only position detection. The pressure sensitive sensor covers the entire surface of the touch panel.

In general, the typical touch panel is provided on a certain image display device, and is required to have a high transparency. Each of the position detecting touch panel and the pressure sensitive sensor has a plurality of films and electrode layers. When the films are transparent and transparent electrodes including ITO are used, the entire touch panel can be transparent, but due to the large stacking number, the light transmissivity is lowered. In addition, since a plurality of components and processes are necessary, the cost is increased. Further, since position information and pressed information are detected separately, the signal process becomes complicated.

Also, in the touch panel described in Patent Document 2, to detect position information and pressed information at the same time, the lattice-shaped fine wire electrodes are formed with respect to the piezoelectric film. Since position information is obtained according to from what lattice-shaped electrode a signal is strongly detected, all the fine wires are required to be connected to the computation processing unit, with the result that the structure becomes significantly complicated.

To address the above problems, an aspect of the present invention provides a touch panel which includes a molecule oriented polylactic acid film, wherein the polylactic acid film has a first principal plane and a second principal plane formed with electrodes, and the electrode on the first principal plane includes divided electrodes which are electrically divided into at least four.

Preferably, the electrode on the second principal plane includes divided electrodes formed so as to be opposite the divided electrodes on the first principal plane, respectively.

The electrode on the second principal plane can include a uniform ground electrode formed so as to be equally opposite the divided electrodes on the first principal plane.

The divided electrodes can be electrically divided by a plurality of electrode division lines including electrode non-forming portions, and the electrode division lines are formed of straight lines having a predetermined width.

The electrode division lines preferably cross at one point in the substantially center of the polylactic acid film at a predetermined angle. The angles formed by the electrode division lines are preferably equal to each other.

The polylactic acid film is preferably molecule oriented by uniaxially stretching.

The electrode division lines can be formed of a first electrode division line and a second electrode division line, and when an angle formed by the first electrode division line and the stretching direction of the polylactic acid film is $\theta_1$ and an angle formed by the second electrode division line and the stretching direction of the polylactic acid film is $\theta_2$, the $\theta_1$ and $\theta_2$ satisfy the condition of the following equation 1:

$$-12°\leq\theta_1\leq12°, -102°\leq\theta_2\leq-78° \qquad 1.$$

The first electrode division line can be formed in the direction which substantially coincides with the stretching direction of the polylactic acid film, and the second electrode division line is formed in the direction substantially orthogonal to the first electrode division line.

Preferably, the electrodes are a transparent electrode having ZnO as a main component.

In a further aspect of the present invention, two or more polylactic acid films are stacked.

The respective divided electrodes are preferably connected to a processor which outputs position information and/or pressed information based on voltages detected independently from the divided electrodes.

The processor preferably includes at least a detection unit which detects respective voltages generated in the divided electrodes, a storage unit which stores a plurality of stored voltage patterns determined previously from respective voltages generated in the divided electrodes and a plurality of pieces of position information corresponding thereto, and a computation unit which creates a detected voltage pattern from the respective voltages detected by the detection unit, compares the detected voltage pattern with the stored voltage patterns, checks the corresponding voltage patterns with a predetermined threshold value to output position information, and computes pressed information from a predetermined voltage similarity ratio of the stored voltage pattern and the detected voltage pattern which have been checked.

The molecule oriented polylactic acid film has piezoelectric properties, and has a transparency equivalent to acryl. Therefore, according to the present invention, the transparent electrode is provided on the polylactic acid film, so that the touch panel and the touch type input device, which have a very high transparency, can obtain, not only position information, but also pressed information, at the same time, and are inexpensive can be realized.

DETAILED DESCRIPTION OF THE INVENTION

First Example

Figure 1:
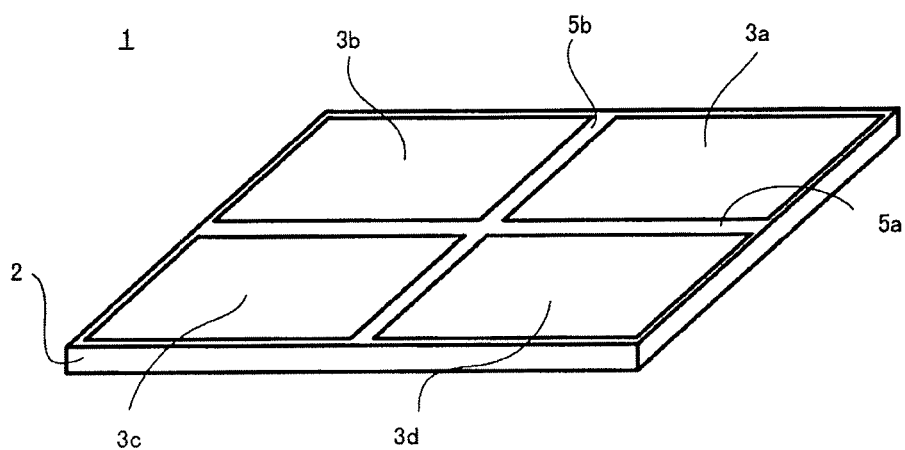
FIG. 1 is a perspective view showing a basic structure of a touch panel of the present invention.

FIG. 1 is a perspective view showing a first example. FIG. 1 enlarges a touch panel 1 which is a main configuration portion of a touch type input device of the present invention. The touch panel 1 is connected to a processor and forms the touch type input device of the present invention. The processor will be described later. The touch panel 1 includes a substrate 2, the substrate 2 having both principal planes formed with electrodes. Electrodes 3a to 3d which are electrically divided by electrode division lines 5a and 5b are formed on a first principal plane of the substrate 2. The electrode division lines 5a and 5b pass through the center of a film and cross each other at an angle of substantially 90°. The substrate 2 is structured of a polylactic acid film, the polylactic acid film having a stretching axis in the direction which substantially coincides with the longitudinal direction of the electrode division line 5a. In the drawing, the respective portions are exaggeratedly shown for explanation, and have dimensions different from the actual dimensions. In addition, here, the touch panel is substantially square, which is not limited.

Figure 2A:
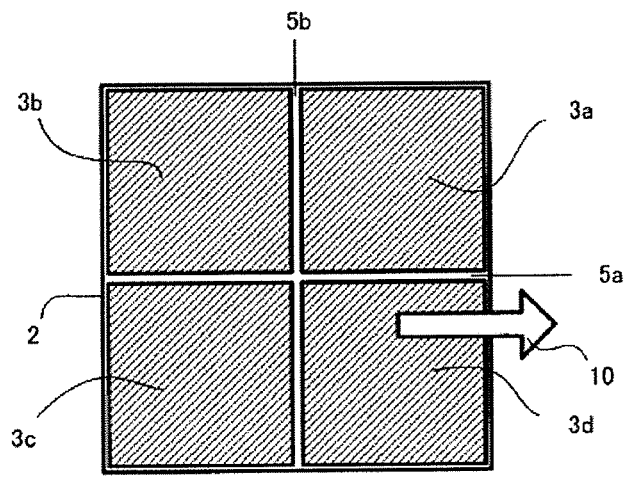
FIG. 2(a) is a plan view showing a front side electrode structure of the touch panel of the present invention.

FIG. 2(a) is a plan view of the touch panel 1. An arrow 10 shows the stretching axis direction of the polylactic acid film. The arrow 10 is depicted onto the plan view for simple explanation, but such arrow is not depicted onto the actual touch panel 1. The electrodes 3a to 3d are electrically connected to a voltage detecting device, which is omitted in this drawing.

Figure 2B:
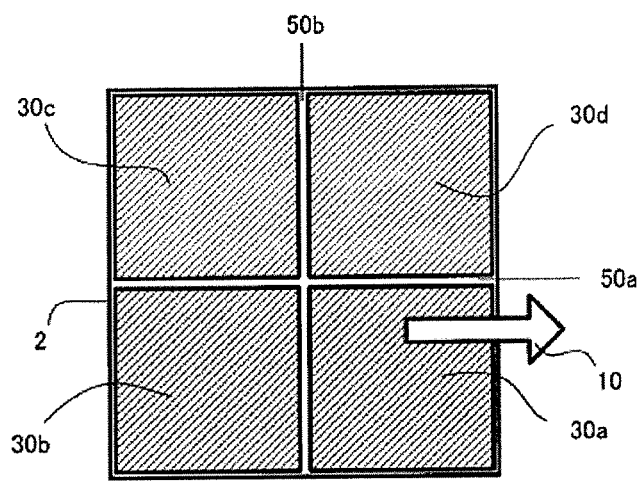
FIG. 2(b) is a plan view showing a back side electrode structure of the touch panel of the present invention.

FIG. 2(b) is a plan view showing an example of a second principal plane (back side) of the touch panel 1 shown in FIG. 2(a), and reversely shows FIG. 2(a) about an electrode division line 50a. Electrodes 30a to 30d divided by the electrode division lines 50a and 50b are formed on the second principal plane so as to be equally opposite the electrodes 3a to 3d on the first principal plane. The electrodes 30a to 30d are opposite the electrodes 3a to 3d in this order. The electrodes 30a to 30d are electrically connected to the voltage detecting device, which is omitted in this drawing.

Figure 2C:
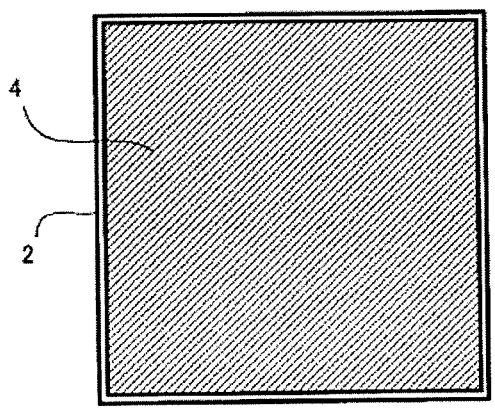
FIG. 2(c) is a plan view showing another back side electrode structure of the touch panel of the present invention.

FIG. 2(c) is a plan view showing another example of the second principal plane of the touch panel 1 shown in FIG. 2(a). A uniform electrode 4 is formed on the second principal plane so as to be opposite all the electrodes 3a to 3d on the first principal plane. The electrode 4 has a ground potential. The electrode 4 is electrically connected to the ground of the device equipped with the touch panel 1, which is omitted in this drawing.

In addition, typically, on the front side and the back side of the touch panel, an antireflection film or a protective film is provided, or an antireflection layer or a protective layer is coated, which is omitted in this example.

Whether the electrode on the second principal plane includes the divided electrodes as shown in FIG. 2(b) or the uniform electrode as shown in FIG. 2(c) with respect to the electrode on the first principal plane is a design matter which can be selected as appropriate at the time of execution. The respective advantages will be described later.

The electrodes 3a to 3d, the electrodes 30a to 30d, and the electrode 4 include ZnO, ITO, IZO (trademark), an inorganic electrode having these as a main component, or an organic electrode having polythiophene as a main component, and such electrodes can be transparent. However, when the electrodes are not required to be transparent, they may include a metal. Various electrode structuring methods including deposition, sputtering, plating, and foiling are applicable. In addition, the electrode on the first principal plane and the electrode on the second principal plane are not always required to be of the same type, and different types of electrodes may be used.

In particular, ZnO which enables film formation at room temperature and has a high transparency is preferably used for polylactic acid. Originally, ZnO has the disadvantage that oxygen deficiency which is a carrier supply source is re-oxidized by reaction with moisture in the atmosphere, thereby increasing resistance. A transparent electrode formed using an off-axis type magnetron sputtering method by doping Ga which is an IIIB group element into ZnO at a high density of 7% by weight or more has no practical problems because the activation energy of reaction of $H_2O$ with ZnO is increased to exhibit an excellent humidity resistance. In addition, in the actual use, in general, on the touch panel 1, the protective film is provided or the protective layer is coated, so that the possibility that moisture can be directly supplied to ZnO is extremely low.

Here, the piezoelectric properties of the polylactic acid will be described. The polylactic acid film is a film which is subjected to molecule orientation and then to a thermal treatment. Typically, the polylactic acid film is subjected to uniaxially stretching to enable the polymer main chain to be oriented in the stretching axis direction. The polylactic acid is a condensation polymer of lactic acid, and the lactic acid monomer including asymmetric carbon has chirality. Therefore, the polylactic acid includes an L type polylactic acid having a main chain wound counterclockwise, and a D type polylactic acid having a main chain wound clockwise. The former will be called PLLA, and the latter will be called PDLA. Since PLLA is typically distributed, hereinafter, the polylactic acid will be represented as PLLA.

In PLLA, C=O and molecules generating permanent dipoles are present in the polymer. When the sum of the dipoles with respect to one molecular chain is calculated, the large dipole is left in the helical axis direction. On the other hand, one reversely oriented molecule chain is present in each crystal unit cell of PLLA, and the dipoles are cancelled in the entire crystal. The point group of the PLLA crystal belongs to $D_2$, and there are $d_{14}$, $d_{25}$, and $d_{36}$ tensor components as piezoelectric strain constants.

It is known that when the film is oriented by uniaxially stretching, the symmetry of part thereof is collapsed due to the influence of the polymer helical structure to exhibit shear piezoelectric properties. The components observed as the piezoelectric strain constants are $d_{14}$ and $d_{25}$, and the component $d_{36}$ is cancelled due to the presence of a vertical mirror surface.

The draw ratio is preferably about 3 to 8 times. The film is subjected to the thermal treatment after stretching to promote crystallization of the extended chain crystal, thereby improving the piezoelectric constant. In the case of biaxially stretching, the draw ratio of the respective axes are made different from each other, so that the same effect as the uniaxially stretching can be obtained. For example, when the film is subjected to 8-time stretching in a certain direction as an X axis and is subjected to twice stretching in a Y axis orthogonal to the X axis, the same piezoelectric constant effect as when the film is subjected to substantially 4-time uniaxially stretching in the X axis direction can be obtained. Since the film which is subjected to simple uniaxially stretching is likely to be torn along the stretching axis direction, the film is subjected to biaxially stretching as described above, so that the strength can be increased to some extent.

In addition to the uniaxially stretching and the biaxially stretching, which have been described here, there is a different PLLA orientation method. For example, part of the side chain of the polymer is substituted with a mesogenic group, the properties in which the mesogenic group is oriented by a magnetic field or an electric field are used to orient the main chain itself in a solution, and a solvent is evaporated in this state to obtain an oriented film. Orientation is also enabled by applying a high pressure in the thickness direction of the film.

Figure 3:
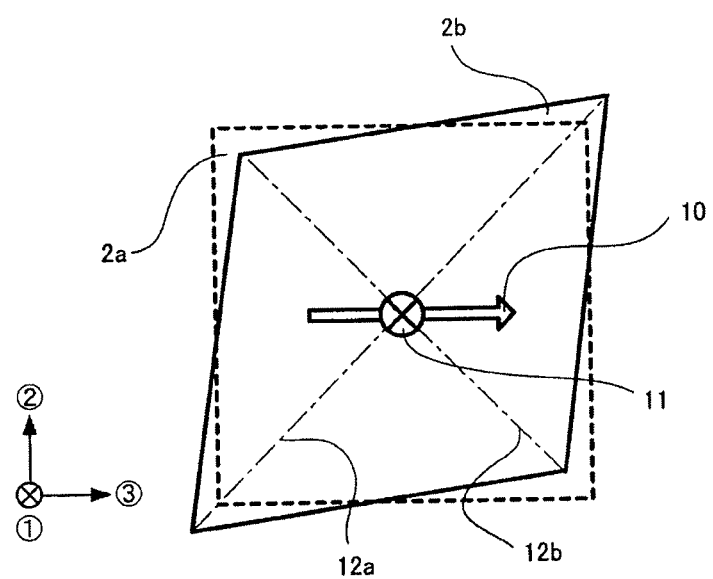
FIG. 3 is an explanatory view for explaining a modification by the piezoelectric phenomenon of polylactic acid.

FIG. 3 is a concept diagram for explaining a modification by the piezoelectric phenomenon of PLLA. The axis directed backward from the front of the drawing sheet is a first axis, and the stretching axis shown by the arrow 10 is a third axis. When an electric field is applied in the first axis direction to a PLLA film 2a, the PLLA film 2a is deformed so as to be extended in the direction which substantially coincides with a diagonal line 12a and to be contracted in the direction which substantially coincides with a diagonal line 12b due to the influence of shear elasticity of $d_{14}$. Finally, the PLLA film is deformed into a shape shown by 2b. A symbol 11 shows the direction of the electric field, and shows that the electric field is present backward from the front of the drawing sheet. A deformation amount is exaggeratedly expressed.

It is known that in $d_{14}$ of PLLA, a value as much as 10 to 20 pC/N can be obtained by arranging the stretching condition, the thermal treatment condition, and the additive mixing condition.

In the film having such piezoelectric properties, when the electric field is applied to cause deformation, as described above, and on the contrary, when deformation is given, a voltage occurs. As an index discussing such properties, there is a piezoelectric stress constant (g constant). In PLLA, $g_{14}$ reaches 300 to $500 \times 10^{-3}$ Vm/N, which is much larger than PVDF ($g_{31} = 216 \times 10^{-3}$ Vm/N) and PZT ($g_{31} = 11 \times 10^{-3}$ Vm/N). Therefore, PLLA is very preferable as sensing application.

Next, a method of obtaining position information and pressed information using $g_{14}$ of PLLA will be described.

Figure 4A:
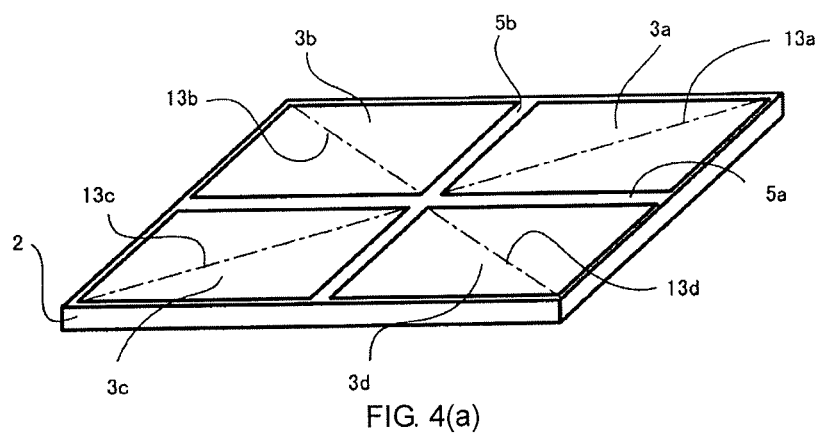
FIGS. 4(a) to 4(b) are perspective views for explaining a basic operation of the present invention.
Figure 4B:
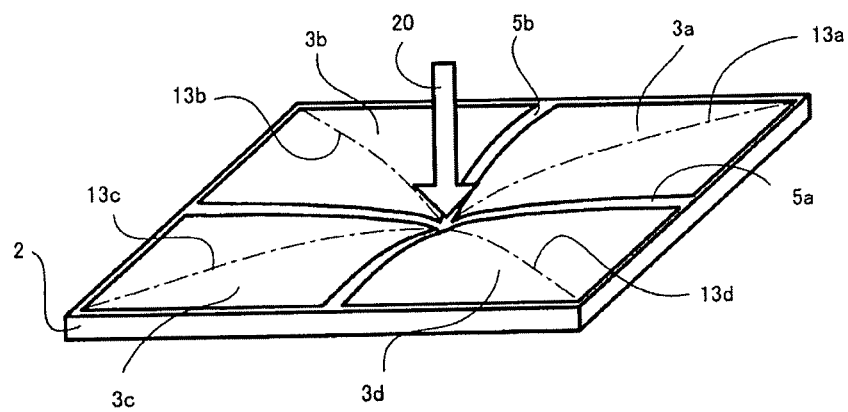

FIG. 4(a) adds diagonal lines 13a to 13d for explanation to the plan view of the touch panel 1 of FIG. 1. The same figure elements are indicated by the same reference symbols, and the description is omitted. When downward force is applied to the center portion of the touch panel 1, the center portion of the touch panel 1 is flexed according thereto. The state of this deformation is shown in FIG. 4(b). An arrow 20 shows the force applied to the center portion of the touch panel 1.

As understood from FIG. 4(b), all the diagonal lines 13a to 13d are extended substantially uniformly. FIG. 3 is applied to FIG. 4(b) for explanation. That is, the diagonal lines 13a and 13c shown in FIG. 4(b) correspond to the diagonal line 12a of FIG. 3, and the diagonal lines 13b and 13d shown in FIG. 4(b) correspond to the diagonal line 12b of FIG. 3.

When the explanation with FIG. 3 is considered reversely, the diagonal line 12a is extended to generate an electric field shown by the symbol 11. Therefore, the diagonal lines 13a and 13c are extended to generate plus potentials in the electrodes 3a and 3c. The diagonal line 12b is contracted in FIG. 3, but when the diagonal line 12b is extended, the electric field shown by the symbol 11 is in the reverse direction. Therefore, the diagonal lines 13b and 13d are extended to generate minus potentials in the electrodes 3b and 3d.

Next, results in which a finite element method simulation is performed by using the model shown in FIG. 4(b) are shown. Table 1 shows calculation conditions, and Table 2 shows calculated results. As shown in FIG. 2(c), the electrode on the back side for this calculation includes the uniform ground electrode.

TABLE 1

| Item | Conditions |
| --- | --- |
| Film size | 50 × 50 mm |
| Film thickness | 75 μm |
| Electrode | Only boundary conditions |
| Width of electrode division line | 0.5 mm |
| Piezoelectric strain constant ($d_{14}$) | 2 OpC/N |
| Pressed spot size | Circle having a radius of 2 mm |
| Pressing force | 0.1N |

TABLE 2

| | Electrode 3a | Electrode 3b | Electrode 3c | Electrode 3d |
| --- | --- | --- | --- | --- |
| Generated voltage (mV) | 78.13 | −77.76 | 76.32 | −79.39 |

As described above, plus potentials are generated in the electrodes 3a and 3c, and minus potentials are generated in the electrodes 3b and 3d. The respective generated voltages are substantially equal.

Figure 5:
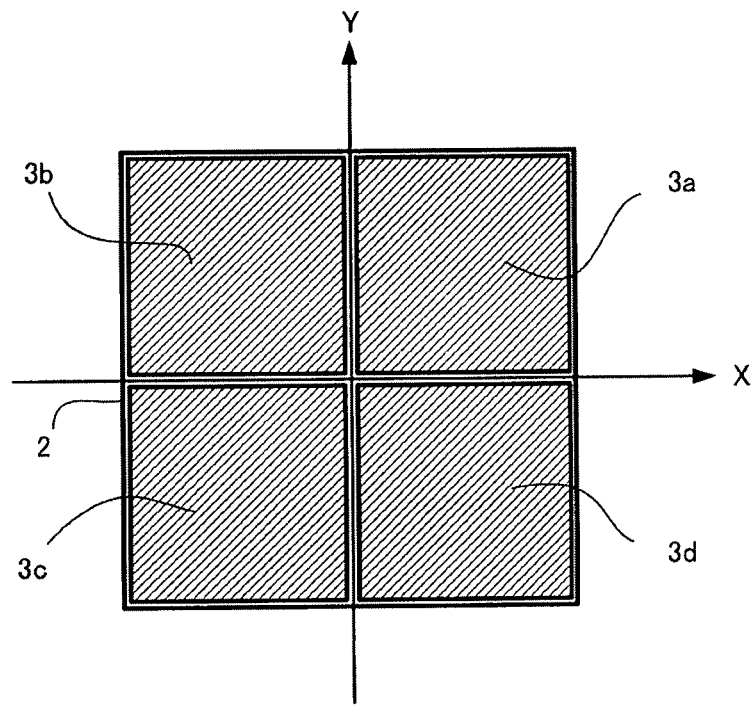
FIG. 5 is a plan view which defines coordinates for explaining the basic operation of the present invention.

Next, there are shown results in which coordinate axes are set so that the center portion of the touch panel 1 is an origin, as shown in FIG. 5 and voltages generated when various positions are pressed are calculated by using the finite element method simulation. The calculation conditions are the same as those shown in Table 1. Table 3 shows voltages generated when positions along the diagonal line 13a are pressed. The unit of the numerical values in the table is mV.

TABLE 3

| Pressed coordinate (X, Y) | Electrode 3a | Electrode 3b | Electrode 3c | Electrode 3d |
| --- | --- | --- | --- | --- |
| (0, 0) | 78.13 | −77.76 | 76.32 | −79.39 |
| (2.5, 2.5) | 81.56 | −64.00 | 42.26 | −58.51 |
| (5.0, 5.0) | 85.25 | −56.84 | 25.55 | −43.18 |
| (7.5, 7.5) | 79.91 | −50.61 | 9.71 | −32.61 |
| (10.0, 10.0) | 71.60 | −42.06 | −4.73 | −20.16 |
| (12.5, 12.5) | 60.59 | −33.80 | −7.92 | −16.99 |
| (15.0, 15.0) | 41.58 | −22.89 | −10.55 | −7.99 |
| (17.5, 17.5) | 22.02 | −11.44 | −9.42 | −3.41 |
| (20.0, 20.0) | 6.27 | −3.31 | −2.73 | −0.57 |

Figure 6:
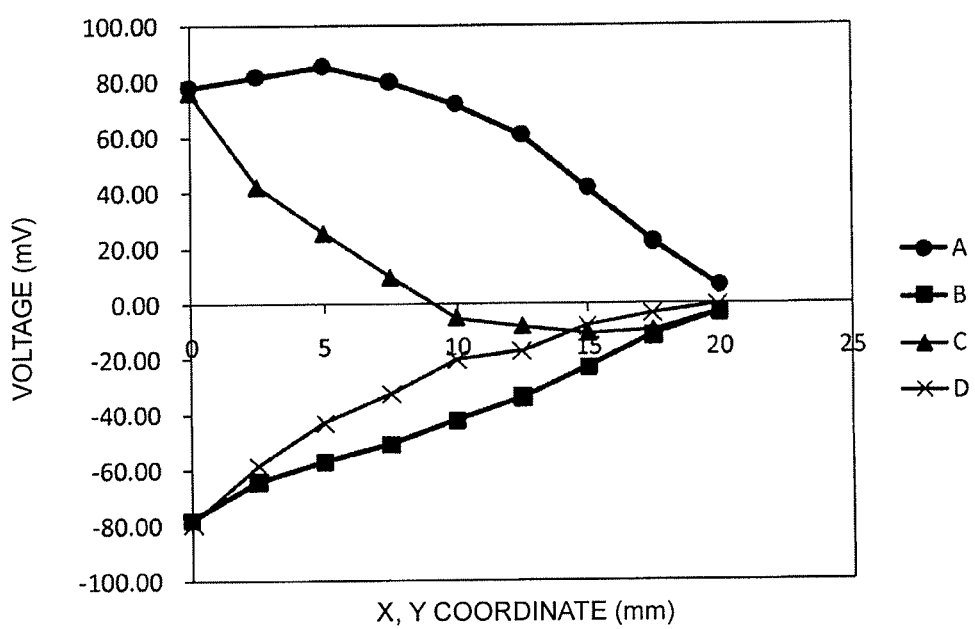
FIG. 6 is a graph showing the relation between pressed information and voltages generated from the respective electrodes when pressing force is applied along diagonal lines of the touch panel of the present invention.

FIG. 6 is a graph of the results of Table 3. Plot points A, B, C, and D shown in the explanatory notes show the voltages generated in the electrodes 3a, 3b, 3c, and 3d, respectively. It is found that the generated voltages are changed substantially smoothly as the pressed positions are changed.

Table 4 shows results in which the distance from the origin of the pressed coordinates is 12.5 mm and angles formed by the Y axis to the X axis are changed, thereby calculating voltages generated in the electrodes 3a to 3d by the finite element method simulation. The calculation conditions are the same as those shown in Table 1.

TABLE 4

| Pressed coordinate (r, θ) | Electrode 3a | Electrode 3b | Electrode 3c | Electrode 3d |
| --- | --- | --- | --- | --- |
| (12.5, 0) | 42.58 | −15.54 | 20.47 | −51.70 |
| (12.5, 30) | 71.04 | −36.19 | 6.24 | −34.50 |
| (12.5, 60) | 85.46 | −60.83 | 1.27 | −25.92 |
| (12.5, 90) | 69.58 | −69.53 | 9.28 | −12.21 |
| (12.5, 120) | 59.16 | −77.27 | 24.81 | −2.84 |
| (12.5, 150) | 41.53 | −73.42 | 45.54 | −4.84 |
| (12.5, 180) | 23.84 | −48.71 | 55.84 | −17.82 |
| (12.5, 210) | 9.34 | −32.78 | 69.85 | −38.62 |
| (12.5, 240) | 5.05 | −23.17 | 82.44 | −54.39 |
| (12.5, 270) | 13.95 | −7.70 | 70.75 | −72.37 |
| (12.5, 300) | 29.24 | 1.44 | 54.52 | −82.55 |
| (12.5, 330) | 48.78 | −1.78 | 37.58 | −77.54 |

Figure 7:
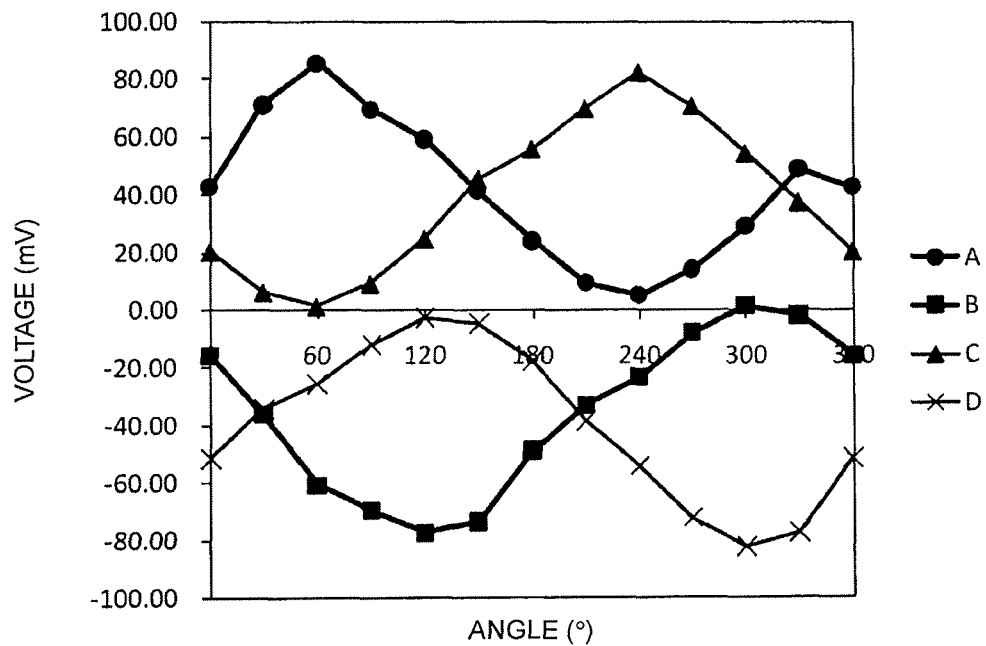
FIG. 7 is a graph showing the relation between pressed information and voltages generated from the respective electrodes when pressing force is applied to positions at predetermined angles to an X axis at an equal distance from the center portion of the touch panel of the present invention.

FIG. 7 is a graph of the results of Table 4. As in FIG. 6, plot points A, B, C, and D shown in the explanatory notes show the voltages generated in the electrodes 3a, 3b, 3c, and 3d, respectively. It is found that the generated voltages are changed substantially smoothly as the pressed positions are changed.

As shown in Tables 2 to 4, the voltages generated in the electrodes 3a to 3d are changed according to the pressed coordinates. A fixed pattern is present in the signs and absolute value magnitudes of the voltages generated in the respective electrodes, and the pattern is analyzed, so that what position on the touch panel 1 is pressed can be obtained as position information.

Next, pressing force detection method will be described. Table 5 shows results in which generated voltages obtained when pressing forces are 0.05 N, 0.1 N, and 0.2 N with respect to the respective positions of (X, Y)=(12.5, 12.5), (−12.5, 12.5), (−12.5, −12.5), and (12.5, −12.5) are calculated by the finite element method simulation. In the respective coordinates, the top, middle, and bottom numerical values of the generated voltages in the electrodes in the table correspond to the pressing forces of 0.05 N, 0.1 N, and 0.2 N.

TABLE 5

| Coordinate (X, Y) | Pressing force | Electrode 3a | Electrode 3b | Electrode 3c | Electrode 3d |
|---|---|---|---|---|---|
| (12.5, 12.5) | 0.05N | 30.29 | −16.90 | −3.96 | −8.50 |
|  | 0.1N | 60.59 | −33.80 | −7.92 | −16.99 |
|  | 0.2N | 121.17 | −67.60 | −15.84 | −33.99 |
| (−12.5, 12.5) | 0.05N | 15.09 | −23.88 | 8.29 | 3.63 |
|  | 0.1N | 30.17 | −47.77 | 16.58 | 7.27 |
|  | 0.2N | 60.35 | −95.54 | 33.16 | 14.53 |
| (−12.5, −12.5) | 0.05N | −3.25 | −8.28 | 29.73 | −17.76 |
|  | 0.1N | −6.50 | −16.55 | 59.47 | −35.51 |
|  | 0.2N | −12.99 | −33.11 | 118.93 | −71.02 |
| (12.5, −12.5) | 0.05N | 9.29 | 4.62 | 13.82 | −25.01 |
|  | 0.1N | 18.59 | 9.23 | 27.64 | −50.02 |
|  | 0.2N | 37.17 | 18.47 | 55.27 | −100.04 |

It is found that when the generated voltages in the respective electrodes on the respective coordinates are compared, the generated voltages with the 0.1 N pressing force are substantially twice the generated voltages with the 0.05 N pressing force, and further, the generated voltages with the 0.2 N pressing force are substantially twice the generated voltages with the 0.1 N pressing force.

Figure 8:
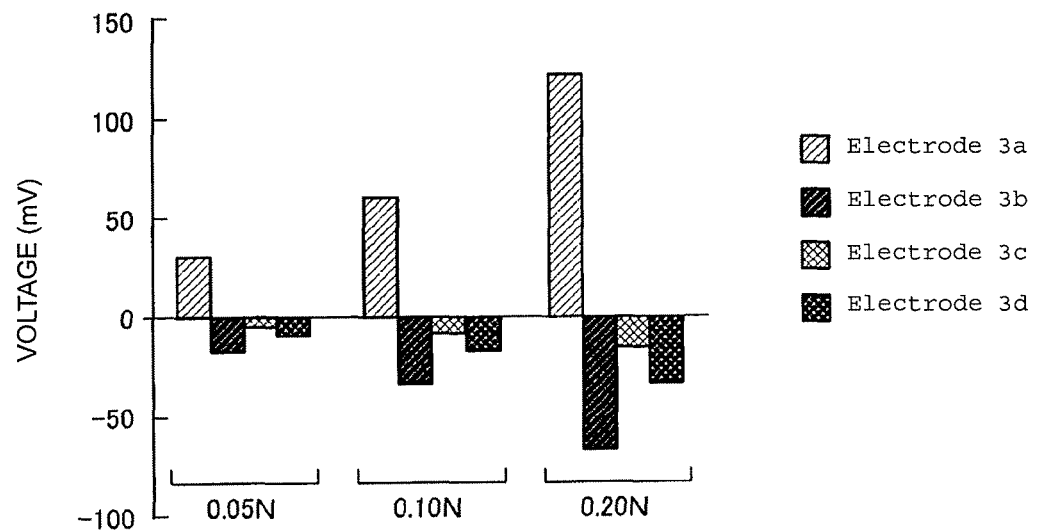
FIG. 8 is a graph of patterns of voltages generated from the respective electrodes when predetermined pressing forces are applied to predetermined positions of the touch panel of the present invention to change the pressing forces.
Figure 9:
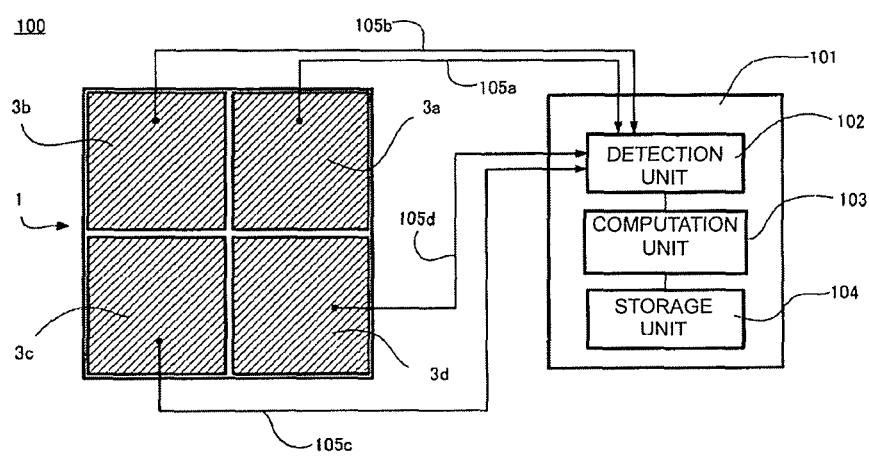
FIG. 9 is a block diagram of a touch type input device of the present invention.

FIG. 8 is a bar graph of the generated voltages of the respective electrodes on the coordinate (12.5, 12.5) according to the pressing forces. The bar graph itself is a visualized voltage pattern. It is found that the magnitudes of the generated voltages are shifted linearly according to the pressing forces. Therefore, by the method described here, the magnitudes of the generated voltages are totally evaluated, so that pressed information can be obtained. With the above description on balance, the function of obtaining position information and pressed information at the same time will be described anew. FIG. 9 explains a touch type input device 100, and is a connection concept diagram of the touch panel 1 and a processor 101. The processor 101 includes a detection unit 102, a computation unit 103, and a storage unit 104. The detection unit 102 is connected to the electrodes 3a to 3d of the touch panel 1 by connection lines 105a to 105d, respectively. The detection unit 102 independently detects voltages generated in the electrodes 3a to 3d when force is applied to the surface of the touch panel 1.

The storage unit 104 stores, as a voltage pattern, voltages generated in the electrodes 3a to 3d when a predetermined position is pressed by predetermined pressing force. The voltage pattern includes, as united information, the signs and magnitudes of the voltages generated in the electrodes 3a to 3d. As a method of storing the magnitudes of the voltages, absolute values of the magnitudes of the voltages may be directly stored, and differences from or ratios to the base electrode voltage may be stored. In particular, the storing method described here may not be required to be limited.

Plural voltage patterns are stored, and the data may be created by a simulation or information when the touch panel 1 is actually pressed may be directly stored. The number of voltage patterns to be previously stored is determined as appropriate in view of the coordinate accuracy required of the touch type input device.

The voltages detected by the detection unit 102 are transmitted to the computation unit 103. The computation unit 103 generates a voltage pattern of the voltages detected by the detection unit 102 by the same method as the voltage patterns stored in the storage unit 104. For example, the voltage pattern of the detected voltages is generated by the same method as when all the voltage patterns stored in the storage unit 104 are stored at ratios to maximum voltages generated in the respective electrodes. Next, the computation unit 103 performs comparison including signs of the created voltage pattern with the voltage patterns stored in the storage unit 104. The voltage patterns stored in the storage unit 104 correspond to position information, but pressed information corresponding to position information is discrete to some extent in consideration of the storage capacity limit and the computing speed. Therefore, the voltage patterns which coincide with each other substantially completely cannot be obtained. When the measured voltage pattern is compared with the stored voltage patterns, square sums of errors between the voltage ratios of the stored voltage patterns and the measured voltage pattern are calculated, a few square sums are selected in ascending order of magnitude, and position information is assumed from magnitudes thereof. When the assumption of position information is completed, the computation unit 103 reads the voltage pattern at the point located around the position from the storage unit 104, and generates the voltage values of the electrodes generating the maximum voltages at the position by linear interpolation. Maximum ratios of the generated voltage values to the detected voltages are calculated, and then, the predetermined pressing force stored in the storage unit 104 is multiplied by each of the ratios, so that actual pressing force can be calculated. The method of determining position information and pressed information described here is not limited.

As described above, in the calculation here, the electrode on the back side opposite the electrodes 3a to 3d includes the uniform ground electrode 4 as shown in FIG. 2(c). The uniform ground electrode 4 has a simple structure and does not require patterning, so that the ground electrode 4 can be formed inexpensively. In addition, the ground electrode 4 has a back side without any electrode non-forming portions, so that when the back side is perspectively seen from the front side, the pattern of the electrode is hard to be recognized.

In addition, as shown in FIG. 2(b), when the same divided electrodes as the front side are structured on the back side, the generated voltages become larger than the former.

By the above method, the touch type input device can use the touch panel 1 having a very simple structure to output position information and pressed information at the same time. As described above, PLLA used as the material of the substrate 2 of the touch panel 1 is a condensation polymer of lactic acid. Typically, lactic acid is made from starch with corns as a raw material by using the force of microorganisms. Therefore, PLLA does not use a fossil fuel as a material, so that carbon dioxide in the air cannot be increased at the time of disposal. In addition, PLLA has a much smaller carbon dioxide exhaust amount at the time of manufacture than other polymers. Further, since PLLA has a biodegradability characteristic, the device having an extremely low environmental load can be provided.

The position information detection and the pressed information detection by the method described here can also be achieved by using other piezoelectric polymers such as PVDF as the substrate 2 in the same electrode structure. When PVDF is used, all the voltages generated from the respective electrodes have a plus potential or a minus potential. This is determined depending on the poling direction of PVDF. PLLA in which there is a polarity in the voltages generated in the respective electrodes has a larger information amount to be obtained than PVDF. In addition, since PVDF is subjected to the poling process, the reduction in piezoelectric constant is observed with time, but the piezoelectric properties of PLLA, which are caused due to the molecular orientation occurring from the stretching and the thermal treatment, are held semi-permanently. Further, when PVDF which is an opaque white polymer is made thinner, it becomes transparent, but it has a lower transparency than PLLA, so that in view of this point, PLLA is very excellent as the touch panel.

Second Example

Figure 10A:
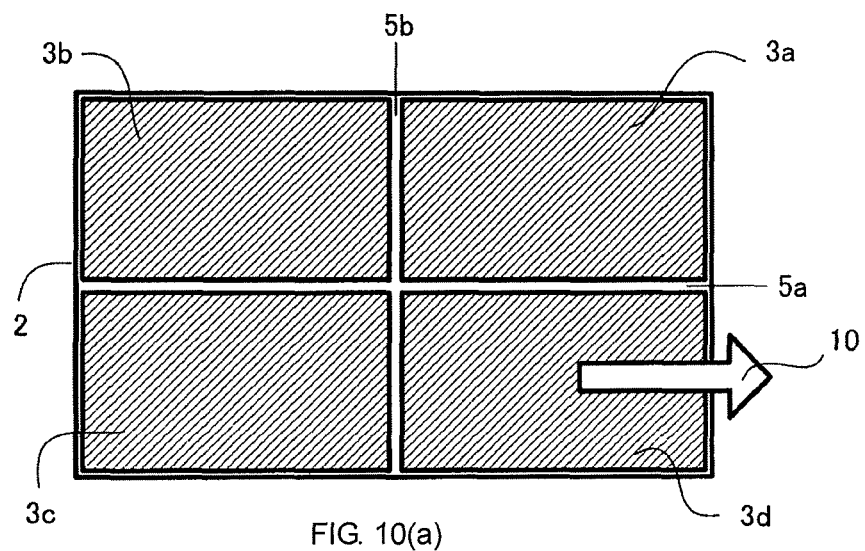
FIG. 10(a) is a plan view showing a second example of the present invention.
Figure 10B:
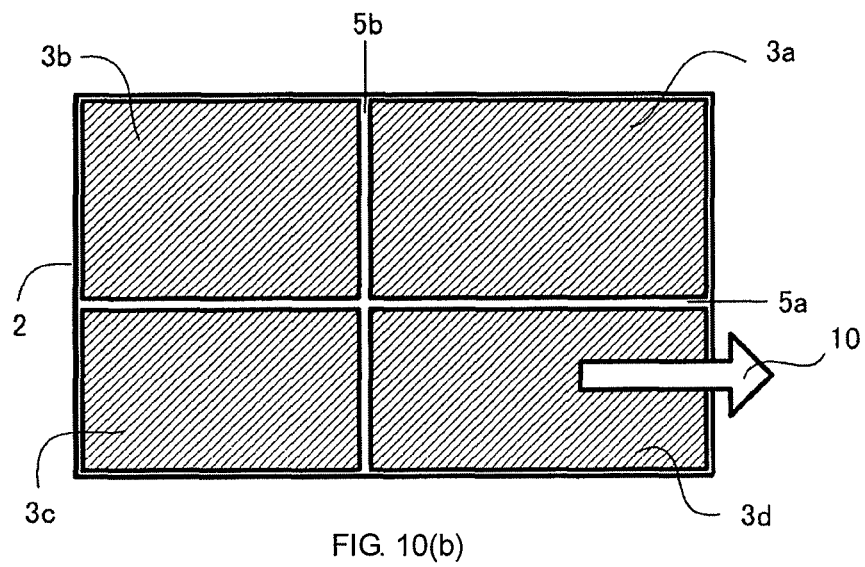
FIG. 10(b) is a plan view showing a modification example of the second example of the present invention.

FIG. 10(*a*) shows another embodiment of the first example shown in FIGS. 1 to 2(*c*). FIG. 10(*a*) corresponds to FIG. 2(*a*), and the back sides corresponding to FIGS. 2B and 2(*c*) are not shown. The following examples and modification examples are also not shown when the electrode on the back side includes the uniform electrode. Components having the same functions are indicated by the same reference symbols, and the description is omitted. The substrate 2 is rectangular. The touch panel is often provided on the surface of a display, and the number of rectangular displays is typically overwhelmingly large, so that the touch panel essentially has the same shape. The touch panel having such shape can function as in the case described in the first example.

FIG. 10(*b*) is a modification example of the example shown in FIG. 10(*a*). The electrode division lines 5*a* and 5*b* do not pass through the center of the substrate 2, and a cross point thereof is in the position shifted from the center portion of the substrate 2. When there is the balance between the position relation between the electrodes and the connection lines and the image displayed below, as in this example, the cross point of the electrode division lines 5*a* and 5*b* may be shifted from the center of the substrate 2 by a predetermined amount. The cross point of the electrode division lines 5*a* and 5*b* is preferably set near the portion in which position detection is necessary most frequently. The shift amount may be set as appropriate according to the design by checking the detection accuracy.

Third Example

Figure 11A:
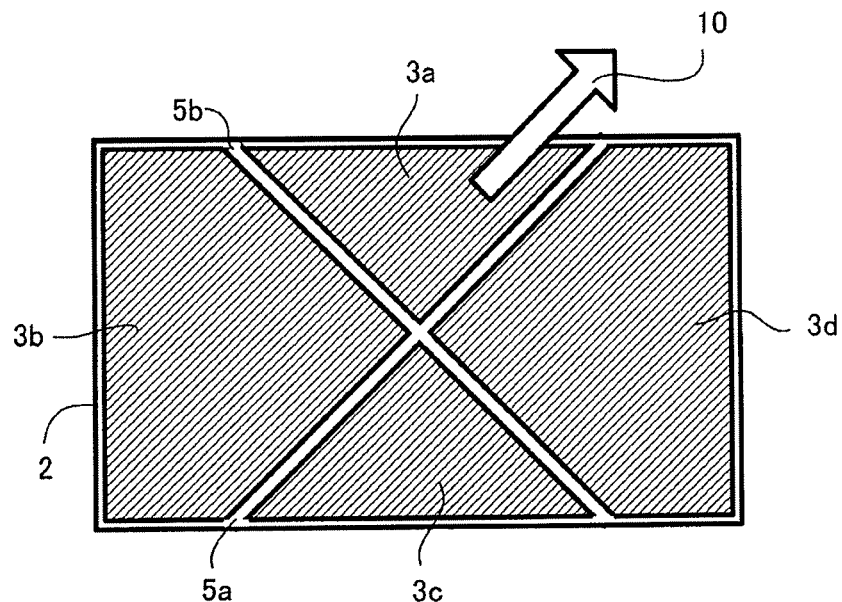
FIG. 11(a) is a plan view showing a third example of the present invention.
Figure 11B:
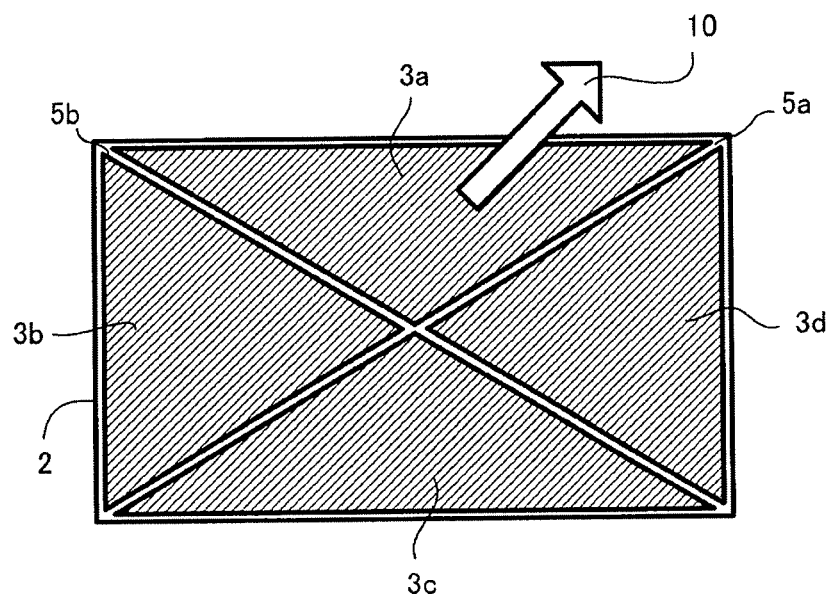
FIG. 11(b) is a plan view showing a modification example of the third example of the present invention.

FIG. 11(*a*) shows another embodiment of the second example. Components having the same functions are indicated by the same reference symbols, and the description is omitted. As in the second example, the substrate 2 is rectangular. PLLA of the substrate 2 is cut out so that the stretching axis is at an angle of 45° to the side of the outer frame of the substrate 2. As described with reference to FIG. 3, PLLA is extended and contracted in the direction at an angle of 45° to the stretching axis by voltage application. Therefore, to efficiently perform voltage detection, as shown in FIG. 11(*a*), preferably, one of the electrode division lines 5*a* and 5*b* is directed in the same direction as the stretching axis, and the other is directed in the direction at an angle of 90° to the stretching axis. In this case, as in FIG. 10(*b*), the cross point of the electrode division lines 5*a* and 5*b* may also be shifted from the center of the substrate 2.

FIG. 11(*b*) is a modification example of the example shown in FIG. 11(*a*). The direction of the stretching axis of PLLA of the substrate 2 is the same as FIG. 11(*a*), but both the electrode division lines 5*a* and 5*b* are not along the direction of the stretching axis, and are formed along the diagonal lines of the substrate 2. The modification example in FIG. 11(*b*) can have a slightly lower detected voltage than FIG. 11(*a*), but can be practically used without any problems.

Next, detected voltage changes with angles formed by the stretching axis of PLLA and the electrode division lines will be described. By citing the above description in connection with FIG. 3, a uniform electric field is applied in the thickness direction of the PLLA film, so that the diagonal line 12*a* at an angle of 45° to the stretching axis is extended, and the diagonal line 12*b* at an angle of −45° to the stretching axis is contracted. Therefore, when the respective electrodes are arranged with respect to the stretching axis, as in the electrode pattern shown in FIG. 2(*a*), ideal voltage changes can be observed.

Figure 12:
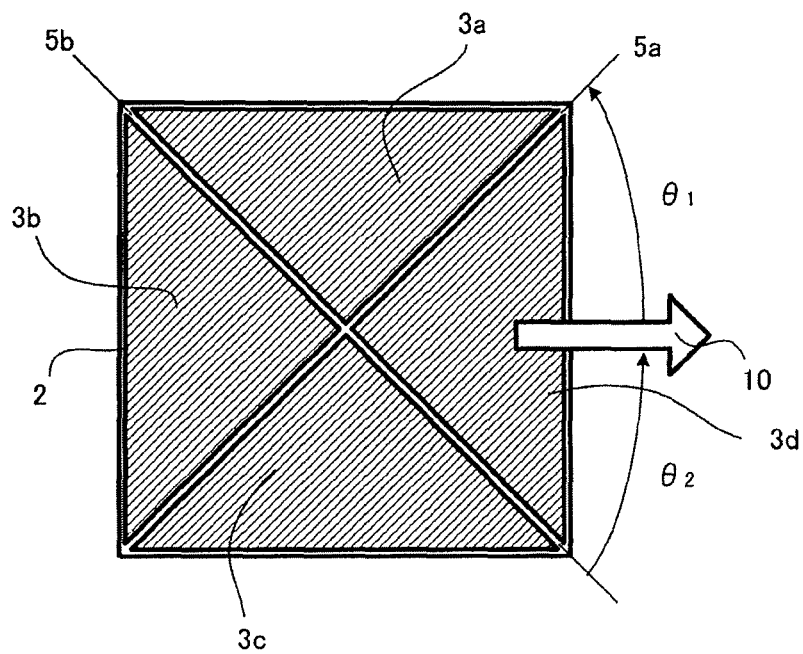
FIG. 12 is a first explanatory view for explaining the third example of the present invention.

FIG. 12 shows a modification example of FIG. 2, and shows a plan view when the electrode division line 5*a* is rotated 45° while the orthogonal state of the electrode division lines 5*a* and 5*b* of FIG. 2 is held. That is, in the drawing, $\theta_1=45°$ and $\theta_2=-45°$. When the center portion of the substrate 2 is pressed in this state, as described above, a plus potential is generated in the portion along the electrode division line 5*a* and a minus potential having a substantially equal absolute value is generated in the portion along the electrode division line 5*b*. Therefore, in the electrodes 3*a* to 3*d*, the voltages are substantially canceled. Therefore, when only two electrode division lines are used, preferably, $0°\leq\theta_1<45°$ and $-90°\leq\theta_2<-45°$.

Figure 13:
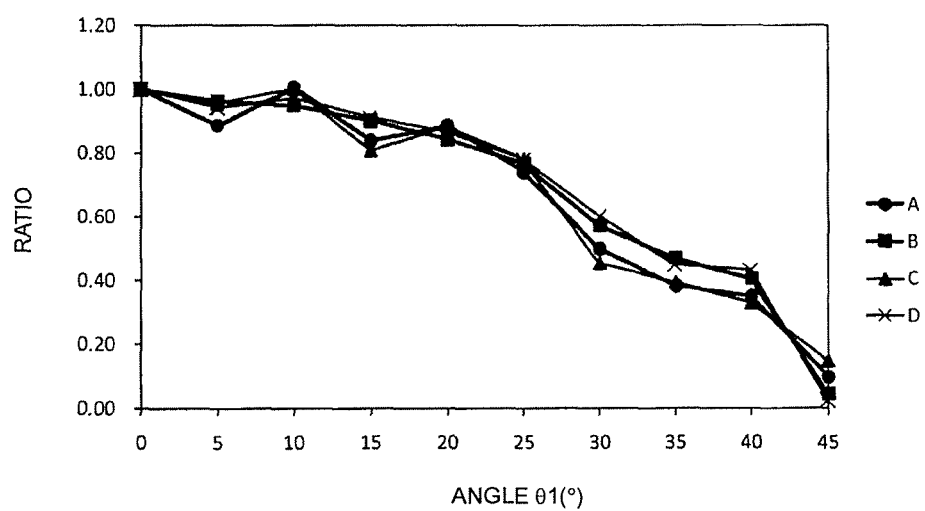
FIG. 13 is a first graph showing the relation between directions formed by electrode division lines and a stretching axis and voltages generated in the respective electrodes in the touch panel shown in the third example of the present invention.

FIG. 13 is a graph showing results in which in the model shown in FIG. 12, voltages generated when the center portion of the substrate 2 is pressed are calculated by the infinite element method simulation. FIG. 13 shows ratios of the voltages generated in the respective electrodes when $\theta_1$ is increased to 45° starting from $\theta_1=0°$ and $\theta_2=-90°$ to voltage values when $\theta_1=0°$ and $\theta_2=-90°$. However, $\theta_2=\theta_1-90°$. According to this graph, it is found that when $\theta_1=45°$, the generated voltages are minimum, and that when $\theta_1$ is slightly decreased from 45°, the voltage values are increased abruptly. When $\theta_1=25°$, the voltages having values of substantially 80% of the maximum value can be obtained. Therefore, when $\theta_1$ is practically set as advantageously as possible, preferably, $\theta_1\leq 25°$. In this graph, the voltage values are symmetric with respect to $\theta_1=0°$, so that the range of $\theta_1$ may be $-25°\leq\theta_1\leq 25°$.

Figure 14:
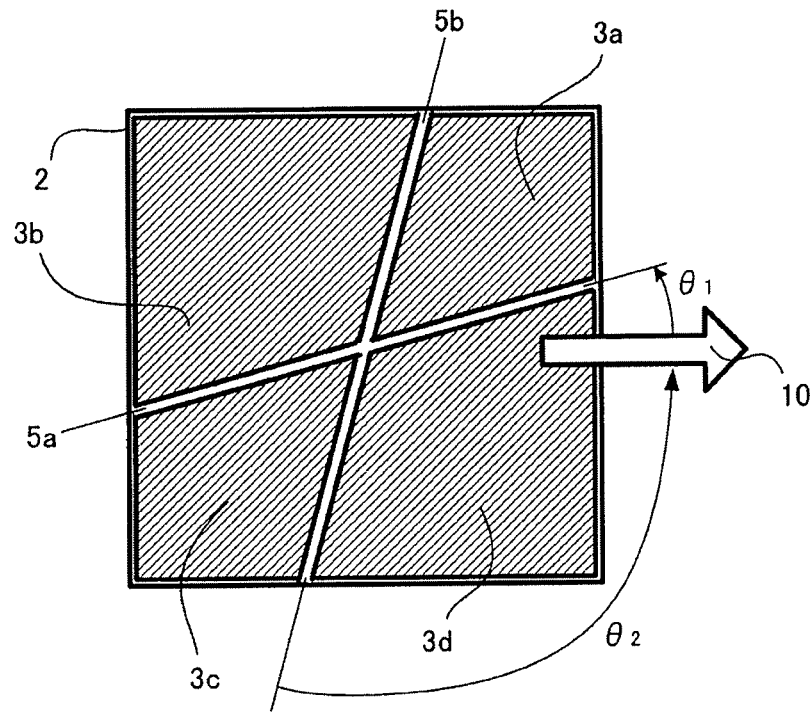
FIG. 14 is a second explanatory view for explaining the third example of the present invention.

Next, the case that the relation in which $\theta_2=\theta_1-90°$ is not satisfied will be described. FIG. 14 shows a modification example of FIG. 2 and a plan view when the electrode division line 5*a* is rotated $\theta_1$ from the stretching axis and the electrode division line 5*b* is rotated $\theta_2$ from the stretching axis.

Figure 15:
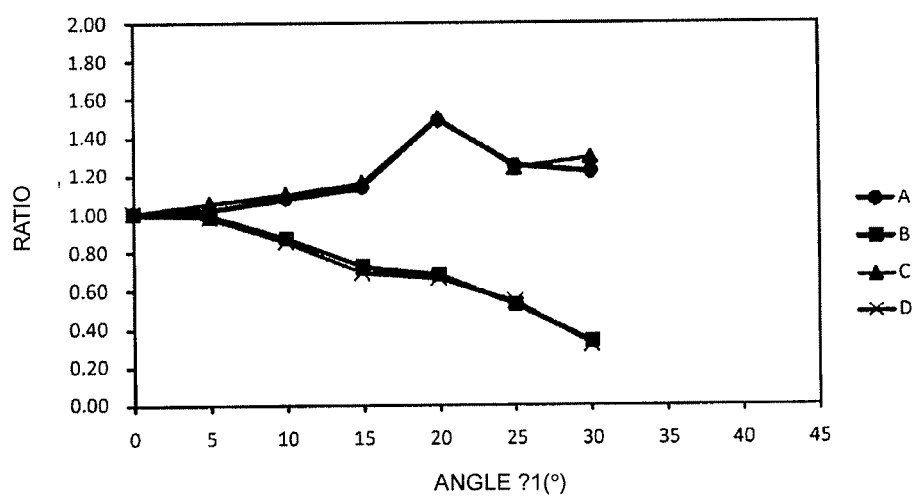
FIG. 15 is a second graph showing the relation between directions formed by electrode division lines and a stretching axis and voltages generated in the respective electrodes in the touch panel shown in the third example of the present invention.

FIG. 15 is a graph showing results in which in the model shown in FIG. 14, voltages generated when the center portion of the substrate 2 is pressed are calculated by the finite element method simulation. FIG. 15 shows ratios of voltages generated in the respective electrodes when $\theta_1$ is increased to 30° starting from $\theta_1=0°$ and $\theta_2=-90°$ to voltage values when $\theta_1=0°$ and $\theta_2=-90°$. However, $\theta_2=-\theta_1-90°$. According to this graph, it is found that the voltages in the divided electrodes 3*a* and 3*c* are increased gradually, and the voltages in the divided electrodes 3*b* and 3*d* are decreased gradually. The decreasing rate of the voltages in the divided electrodes 3*b* and 3*d* is larger than the increasing rate of the voltages in the divided electrodes 3*a* and 3*c*. When the voltage having a value of 80% of the maximum value is attempted to be obtained, the range of $\theta_1$ is $0°\leq\theta_1\leq 12°$. In this graph, the voltage values are substantially symmetric with respect to $\theta_1=0°$, the range of $\theta_1$ may be $-12°\leq\theta_1\leq 12°$. As described with reference to FIGS. 12 and 13, when the relation of $\theta_2=\theta_1-90°$, the range of $\theta_1$ is $-25°\leq\theta_1\leq 25°$, so that the voltage of 80% or more of the maximum value of the generated voltage can be detected. Therefore, with all things considered, when $-12°\leq\theta_1\leq 12°$, $\theta_2$ is in the range of $-102°\leq\theta_2\leq-78°$, so that the practically preferable range can be determined without setting any special relation between $\theta_1$ and $\theta_2$. Here, the decreasing amount of the voltage with respect to the maximum voltage is 80%, but this is an amount which can be typically considered by those skilled in the art, and the decreasing amount may be considered to be a smaller value than this when there are no problems in the actual use, and the values of $\theta_1$ and $\theta_2$ to be taken may be increased as appropriate.

Fourth Example

Figure 16:
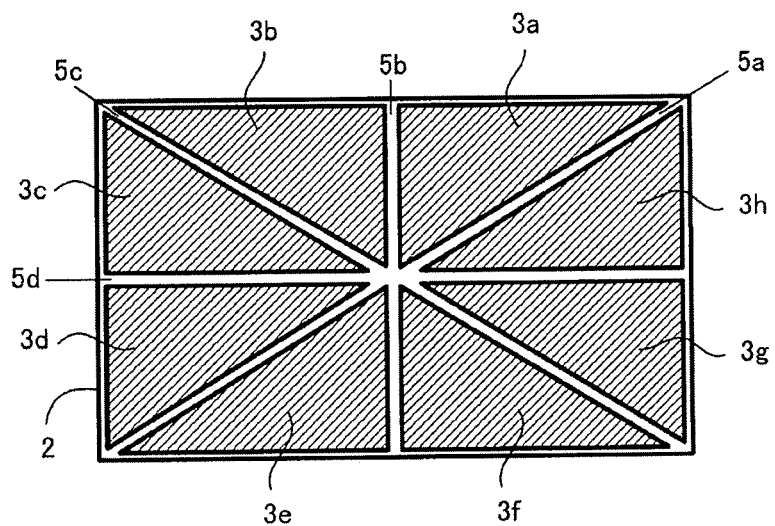
FIG. 16 is a plan view showing a fourth example of the present invention.

FIG. 16 is a plan view showing another embodiment of the first to third examples. Components having the same functions as the above examples are indicated by the same reference symbols, and the description is omitted. The electrode formed on the principal plane of the substrate 2 is divided into eight divided electrodes 3a to 3h by the electrode division lines 5a to 5d. The operation principle of this example is equal to that described in the first example.

The number of voltage detection elements is increased, so that the voltage pattern with respect to position information can be formed more finely. Thereby, both position information and pressed information can increase the accuracy.

All the electrode division lines 5a to 5d cross in the center portion of the substrate 2 in this example, but are not always required to cross in the center portion, as described in the second example.

Preferably, the electrode division lines are in the direction which coincides with the stretching axis and are orthogonal thereto, or other electrode division lines are set at angles as described in the third example so that the angles formed by the electrode division lines are equalized, or other electrode division lines are provided so that the divided electrodes divided by the electrode division lines are divided by an equal area to the extent possible.

Fifth Example

Figure 17:
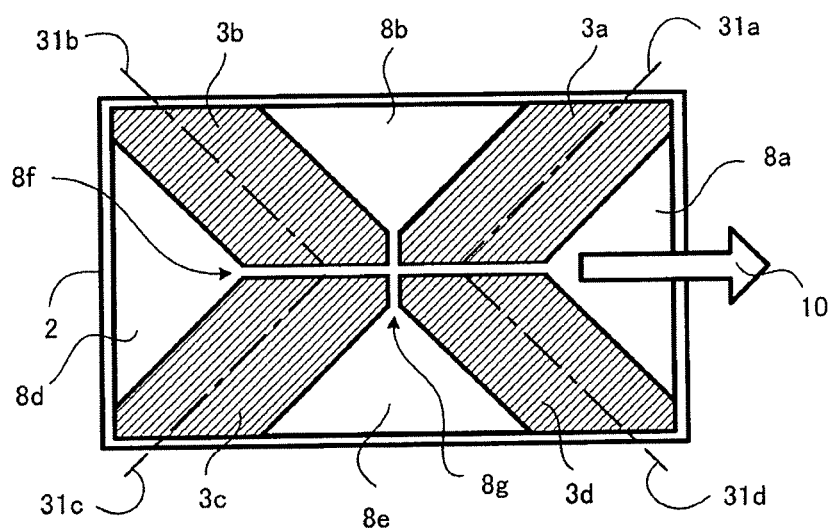
FIG. 17 is a plan view showing a fifth example of the present invention.

FIG. 17 is a plan view showing a further embodiment of the first to fourth examples. Components having the same functions as the above examples are indicated by the same reference symbols, and the description is omitted. Irregular shaped electrodes 3a to 3d and electrode non-forming regions 8a to 8g are formed on the principal plane of the substrate 2. The electrodes 3a to 3d are electrically divided by the electrode non-forming regions, and can perform the same operation as other examples. Centerlines 31a to 31d are the centerlines showing the longer axis of the electrodes. As shown here, the electrodes are not always required to cover the entire principal plane of the substrate 2. In the electrode structure shown in FIG. 17, each of the electrodes 3a to 3d is in the direction at one of 45° and −45° to the stretching axis shown by the arrow 10, that is, each of the centerlines 31a to 31d is in the direction at one of 45° and −45° to the stretching axis shown by the arrow 10, so that the possibility that only electric charges of the same sign can occur in the island of one electrode by pressing becomes extremely high. Therefore, the possibility that the voltages can be cancelled by reverse electric charges becomes very low.

The electrodes are not always required to be axisymmetric with respect to the centerlines of the substrate 2. The methods shown in the second and fourth examples are combined to enable various electrode shapes to be set. The edges of the electrodes are not always required to be a straight line, and may be a curved line. These are matters determined, as need, according to the design.

Sixth Example

Figure 18:
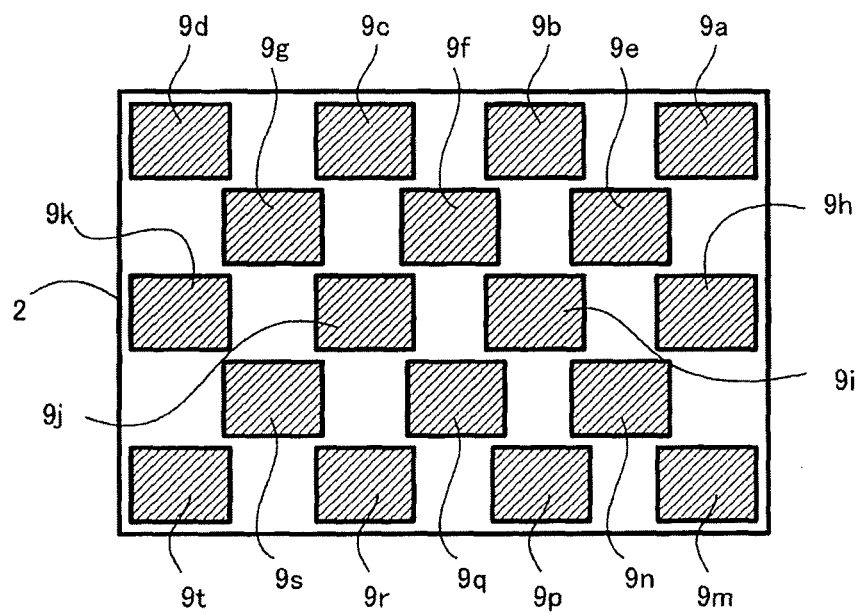
FIG. 18 is a plan view showing a sixth example of the present invention.

FIG. 18 is a plan view showing an embodiment having an electrode shape concept different from the first to fifth examples. Electrodes 9a to 9t are formed in a check pattern on the principal plane of the substrate 2. All the extraction electrodes of the electrodes 9a to 9t are not shown. Pressing force is applied to a predetermined position on the substrate 2, so that voltages according to the pressed coordinate and the pressing force are generated in the electrodes 9a to 9t. Since a plurality of electrodes are present, a detailed voltage pattern can be obtained, so that the improvement of the position detection accuracy can be expected. Since the number of voltages obtained is large to increase the load of the analyzing process, the computing process may be executed by narrowing down the electrodes which output voltages above a specified threshold value.

When the number of divided electrodes is increased as in the example shown here, the consideration of the direction with the stretching axis becomes meaningless, so that free arrangement is enabled. Here, the example in which the electrodes are arranged in the check pattern, but the electrodes may be arranged in a matrix sectioned by lattice-shaped electrode division lines. In the lattice-shaped electrode division lines at this time, more preferably, one of the vertical axis and the horizontal axis is along the stretching axis and the other is at substantially 90° with respect to the one axis.

In addition, the shape of the electrodes is not limited to be square and rectangular, and may be polygonal, circular, elliptical, and irregular shape. The same position information and pressed information obtaining method as the first example is used. The electrode division number is a design matter to be determined in consideration of the signal processing ability.

As described in the first example, the electrode on the back side in the second to sixth examples may include the divided electrodes opposite the electrodes shown in the plan views in the examples, and may form a uniform ground electrode. This is a design matter which can be selected as appropriate for execution.

The case that the number of divided electrodes is reduced to less than four will be described here. For example, when the electrode formed on the principal plane is divided into two, the detected voltage pattern is significantly deteriorated, with the result that the detection of position information can be rough. Various accuracies are required of the touch panel according to devices to which the touch panel is applied, so that among the devices, the devices requiring only low accuracy can reduce the electrode division number. For example, only when which of the right half and the left half of the touch panel is pressed should be judged, the electrode division number may be about two or three.

Seventh Example

Figure 19:
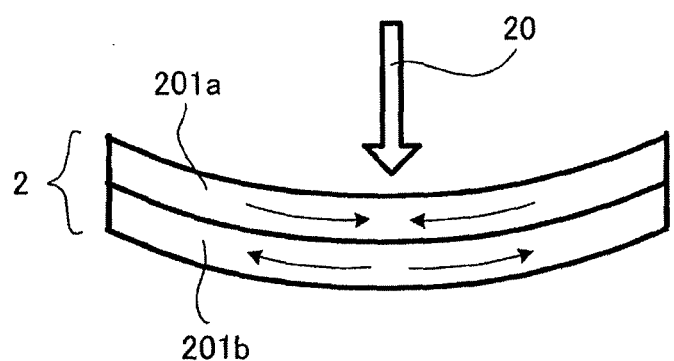
FIG. 19 is an explanatory view for explaining a seventh example of the present invention.

FIG. 19 is a concept diagram for explaining a still further embodiment. In the substrate 2, two PLLA films 201a and 201b are stacked. The PLLA films 201a and 201b are formed with electrodes as described in the above examples. The adhesive interface portion of the PLLA films 201a and 201b is on the ground electrode side of both films, which is simple and preferable in structure. In this drawing, the electrodes and the adhesive are omitted. FIG. 19 shows a cross section of the portion to which a stress shown by the arrow 20 is applied, and the substrate 2 is flexed by this stress. With the interface as a neutral surface, a compressive stress occurs in the PLLA film 201a, and a tension stress occurs in the PLLA film 201b. When the four divided electrodes are formed on the PLLA films 201a and 201b, voltages according to the stresses are generated in the electrodes. Since the PLLA films 201a and 201b can form a more detailed voltage pattern than one layer, position information and pressed information can both increase the accuracy. Also, when the angle formed by the stretching directions of the PLLA films 201a and 201b is 90°, molecular chains are perspectively formed in a lattice shape, so that the touch panel can be strong. However, the angle between the stretching axes is not necessary 90°, and when it is larger than 0°, the increase of the strength can be expected. Also, the stacking number is not limited to two, and may be increased, as needed. The touch panels shown in the first to fifth examples only show typical examples of the present invention. The results calculated by the finite element method simulation are changed according to film thickness, other electric constants, the types, thickness, and hardness of protective films to be stacked, and the numerical values shown here are not limited. Therefore, the distribution, detection method, and computing method of detected voltages should be determined according to the design for execution.

The touch panel and the touch type input device of the present invention can obtain position information and pressed information at the same time by a simple structure, have a high transparency, and can be inexpensive. Further, a very great merit that no load is given to an environment at the time of disposal can be obtained, so that there is an industrial applicability.

DESCRIPTION OF REFERENCE SYMBOLS

1 Touch panel
2 Substrate
3a to 3h Divided electrode
4 Ground electrode
5a to 5d Electrode division line
8a to 8g Electrode non-forming portion
9a to 9t Electrode
10 Arrow showing the stretching axis of a film
11 Symbol showing the direction of an electric FIELD
30a to 30d Electrode
31a to 31d Electrode centerline
50a, 50b Electrode division line
100 Touch type input device
101 Processing unit
201, 201b PLLA film

The invention claimed is:

1. A touch panel comprising:
a molecule oriented polylactic acid film having a first principal plane and a second principal plane; and
a divided electrode having a plurality of sections arranged on at least one side of the first principal plane and the second principal plane of the polylactic acid film,
the polylactic acid film being constructed to generate independent voltages in regions corresponding to a respective section of each of the plurality of sections of the divided electrode when the polylactic acid film is deformed to have a concave shape on the first principal plane and a convex shape on the second principal plane.

2. The touch panel according to claim 1, wherein the polylactic acid film has a shear piezoelectric property.

3. The touch panel according to claim 1, wherein the polylactic acid film is an L type polylactic acid film.

4. The touch panel according to claim 1, wherein the polylactic acid film is a D type polylactic acid film.

5. The touch panel according to claim 1, wherein the divided electrode is electrically divided into at least four sections.

6. The touch panel according to claim 5, wherein the divided electrode is a first divided electrode and is on a side of the first principal plane, and the touch panel further comprises a second divided electrode on a side of the second principal plane, the second divided electrode having respective sections opposite to the sections of the first divided electrode.

7. The touch panel according to claim 1, wherein the divided electrode is on a side of the first principal plane, and the touch panel further comprises a uniform ground electrode on a side of the second principal plane.

8. The touch panel according to claim 5, wherein the divided electrode is electrically divided by a plurality of electrode division lines including electrode non-forming portions.

9. The touch panel according to claim 8, wherein the electrode division lines are straight lines having a predetermined width.

10. The touch panel according to claim 8, wherein the electrode division lines cross at a point in substantially a center of the polylactic acid film at predetermined angles.

11. The touch panel according to claim 10, wherein the predetermined angles formed by the electrode division lines are equal to each other.

12. The touch panel according to claim 8,
wherein the plurality of electrode division lines include at least a first electrode division line and a second electrode division line,
wherein when a first angle formed by the first electrode division line and a stretching direction of the polylactic acid film is $\theta_1$ and a second angle formed by the second electrode division line and the stretching direction of the polylactic acid film is $\theta_2$, and $\theta_1$ and $\theta_2$ satisfy:

$-12°\leq\theta_1\leq12°, -102°\leq\theta_2\leq-78°$.

13. The touch panel according to claim 12,
wherein the first electrode division line is in a direction which substantially coincides with the stretching direction of the polylactic acid film,
wherein the second electrode division line is in a direction substantially orthogonal to the first electrode division line.

14. The touch panel according to claim 1, wherein the divided electrode is a transparent electrode having ZnO as a main component.

15. The touch panel according to claim 1, further comprising a second polylactic acid film stacked on the molecule oriented polylactic acid film.

16. A touch type input device comprising:
the touch panel according to claim 1; and
a processor connected to the sections of the divided electrode, the processor configured to output at least one of position information and pressed information based on the independent voltages generated in each of the regions corresponding to each of the respective sections of the plurality of sections of the divided electrode.

17. The touch type input device according to claim 16, wherein the processor includes at least:
a detection unit which receives values corresponding to the independent voltages generated in each of the regions corresponding to each of the respective sections of the plurality of sections of the divided electrode;
a storage unit which stores a plurality of stored voltage patterns and a plurality of pieces of position information corresponding thereto; and
a computation unit which creates a detected voltage pattern from the values received by the detection unit, compares the values received with the stored voltage patterns, checks the detected voltage pattern with a predetermined threshold value to output the position information, and computes the pressed information from a predetermined voltage similarity ratio of the stored voltage pattern and the detected voltage pattern.

* * * * *